(No Model.)
J. EIDMAN.
Animal Trap.
No. 240,583. Patented April 26, 1881.
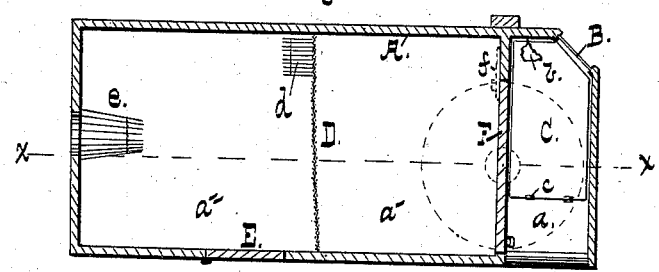
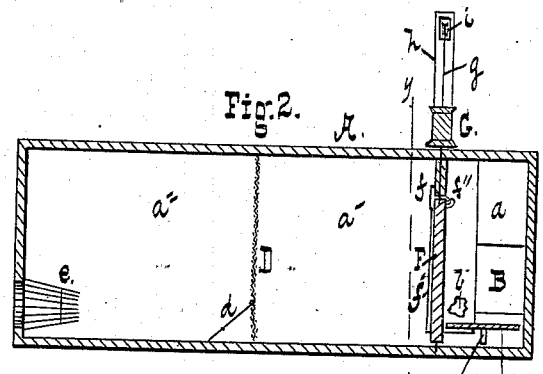
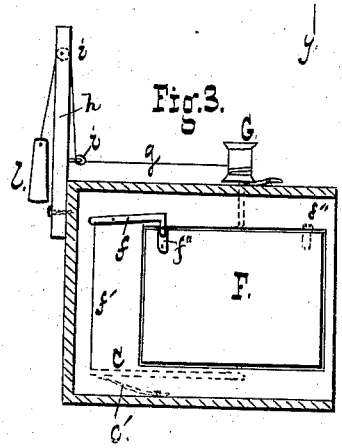
Witnesses,
W. A. Bertram
C. H. Fish
Inventor,
John Eidman.
by
R. D. Williams,
Attorney.

UNITED STATES PATENT OFFICE.

JOHN EIDMAN, OF BALTIMORE, MARYLAND.

ANIMAL-TRAP.

SPECIFICATION forming part of Letters Patent No. 240,583, dated April 26, 1881.

Application filed January 13, 1881. (No model.)

*To all whom it may concern:*

Be it known that I, JOHN EIDMAN, of Baltimore city, State of Maryland, have invented certain new and useful Improvements in Animal-Traps; and I hereby declare the same to be fully, clearly, and exactly described as follows, reference being had to the accompanying drawings, in which—

Figure 1 is a horizontal sectional view of the trap. Fig. 2 is a sectional view on the line $x$ $x$ of Fig. 1, and Fig. 3 is a sectional view on the line $y$ $y$ of Fig. 2.

My invention relates to that class of traps in which a bait is used to lure the animal into a part of the trap, from which he is driven into a second compartment and the trap is reset for the next comer; and it consists in certain features of construction, as hereinafter set forth and claimed.

In the drawings, A is the trap, constructed, by preference, of metal; or, if of wood and designed to catch rodents, such as rats or mice, it is metal-lined. It is divided into three compartments, $a$ $a'$ $a''$. The entrance to the former is permanently open, and at its end is placed the bait $b$, opposite which is a window, B, to render the bait visible.

F is a door in the partition, separating the compartments $a$ $a'$, pivoted about a central axis, and having catches $f''$. On the end of the pivot of the door is mounted a spool, G, having a common ratchet-and-pawl attachment, and from the spool leads a cord, $g$, over pulleys $i$ $i$, to a weight, $l$. The rod $h$, on which the pulleys are secured, is attached to the side of the trap in such manner that it will fold down for packing, and may be secured in a vertical position for use.

The floor C of the compartment $a$ is hinged at $c$, and is supported at its inner end by a spring, $c'$. It is connected, by a wire, $f'$, with a lever, $f$, adapted to engage with the catch $f''$, the reverse rotation of the door being prevented by a simple catch on the other side of the jamb. The compartment $a'$ is separated from that $a''$ by a wire-gauze partition, D, having the usual swing-flap, $d$, and the compartment $a''$ has a door, E, and cone $e$, of the usual construction.

In operation the rat or other animal, being lured by the bait $b$, steps on the platform C, which is depressed by his weight, releasing the lever $f$. The door F instantly swings, closing the opening behind the animal and driving him before it into the compartment $a'$. He of course seeks to escape from this compartment, and perceiving the light through the opening behind the cone $e$, he enters the compartment $a''$ through the swinging door $d$. Meanwhile the trap has automatically set itself, and the next comer joins the first.

The device is automatic in its action. There is no waste of bait, as the animals are driven away from it before they can seize it, and the operation of the trap only ceases when it is full or the weight $l$ touches the floor. In this latter case the spool G is simply rewound by a reverse rotation, of which its ratchet-and-pawl attachment admits.

What I claim is—

The trap herein described, consisting of the three compartments having the permanent gauze partition and cone $e$, the pivoted door F, ratcheted drum G, with cord and weight, pivoted platform C, lever $f$, and slotted catch $f''$, locking the door against rotation in either direction until the platform is depressed, as set forth.

JOHN EIDMAN.

Witnesses:
R. D. WILLIAMS,
J. C. GITTINGER.